Figure 1:
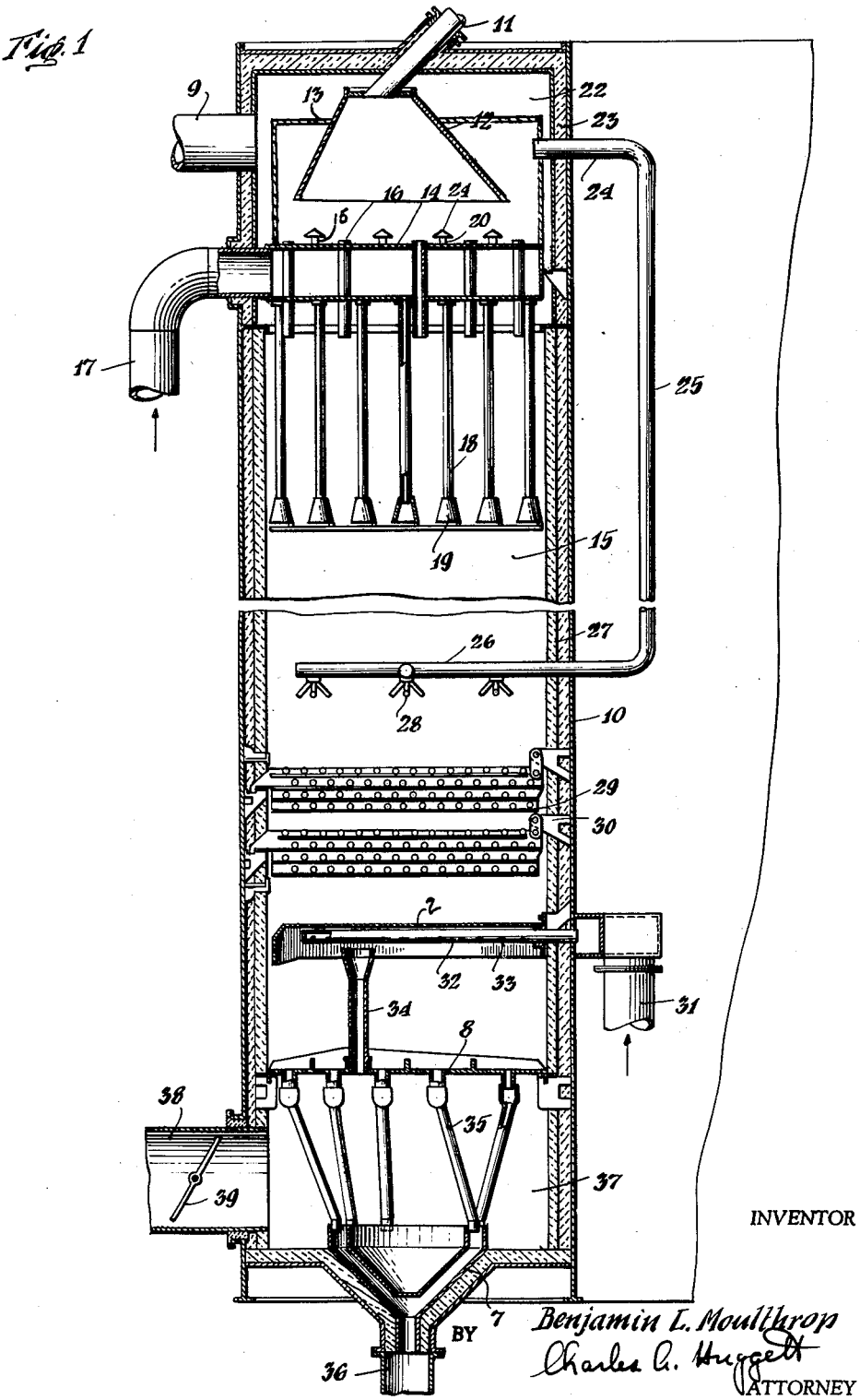

June 21, 1960 B. L. MOULTHROP 2,941,955
ELIMINATION OF OIL PLUME WITHIN REGENERATION SYSTEM
Filed April 3, 1956 3 Sheets-Sheet 1

INVENTOR
Benjamin L. Moulthrop
BY Charles A. Huggett
ATTORNEY

June 21, 1960 B. L. MOULTHROP 2,941,955
ELIMINATION OF OIL PLUME WITHIN REGENERATION SYSTEM
Filed April 3, 1956 3 Sheets-Sheet 3

INVENTOR
*Benjamin L. Moulthrop*

BY *Charles G. Huggett*

ATTORNEY

United States Patent Office 2,941,955
Patented June 21, 1960

2,941,955

ELIMINATION OF OIL PLUME WITHIN REGENERATION SYSTEM

Benjamin L. Moulthrop, Pitman, N.J., assignor to Socony Mobil Oil Company, Inc., a corporation of New York Filed Apr. 3, 1956, Ser. No. 575,854

9 Claims. (Cl. 252—418)

This invention relates to improvements in the method and apparatus for the continuous conversion of or transformation of hydrocarbons in the presence of a granular contact material. It has particular relation to a method and apparatus for conveying a gas containing contaminants removed from a contact material in the inlet section of a regeneration system and conducting the gas containing the contaminants into contact with a hotter zone within the regeneration system during regeneration of the solid contact material so as to effect combustion of the contaminants thereby eliminating an oil plume.

Typical of processes to which this invention applies is the catalytic conversion of high-boiling hydrocarbons to lower boiling hydrocarbons wherein a granular, adsorbent, catalytic contact material is passed cyclically through successive zones or vessels, in the first of which it is contacted with a high-boiling hydrocarbon charge at temperatures of 850° F., and upward, to effect the conversion of said charge to lower boiling hydrocarbons which may contain large percentages of gasoline, and in the second of which contaminants deposited on the contact material are removed so that the contact material will be in a suitable condition for re-use in the conversion zone. Other exemplary processes are thermal vis-breaking, coking or cracking of hydrocarbon charge by contact with heated granular inert contact materials, or the reforming of gasoline-boiling constituents in the presence of suitable catalyst for the purpose of improving the fuel quality.

In processes wherein the contact material is catalytic in nature, it may partake of the nature of natural or synthetic clays, bauxite, activated alumina or synthetic associations of silica, alumina or silica and alumina to which other substances, such as certain metallic oxides, may be added in small amounts. When the contact material is inert in character, it may partake of the form of refractory materials, such as mullite, or it may partake of the form of stones, or metallic particles, or balls, or particles of coke.

The contact material should be of palpable particulate form as distinguished from finely divided powders, and the term "granular," as used herein, should be understood to include any contact material of this form. The contact material may take the shape of pellets, tablets, spheres, capsules, or particles of irregular shape, such as are obtained from grinding and screening operations. Generally, the contact material granules should be within the range 3 to 100 mesh and, preferably, within the range 4 to 20 mesh by Tyler standard screen analysis.

In processes of the above-mentioned types, the cracking of the high-boiling hydrocarbons to lower boiling hydrocarbons results in the deposition of carbonaceous or more properly, hydrocarbonaceous contaminants on the contact material. These hydrocarbonaceous contaminants consist principally of compounds of hydrogen and carbon, sometimes with impurities, such as sulfur and nitrogen, etc., compounds present. Often, at least a portion of the deposit may comprise tarry or heavy oily hydrocarbon material, or heavy organic material. These carbonaceous contaminants must be removed before the contact material can be re-used for conversion. The usual method of removal is by burning these contaminants off with an oxygen-containing gas, such as air, the oxygen-containing gas being converted to flue gas. During the transfer of the contact material to the regeneration chamber, a portion of the contaminant deposit, usually the heavy hydrocarbon portion, may be converted to lower boiling combustible material, or hydrocarbons which are vaporized under the existing operation temperatures. These materials vaporize either during transfer of the contact material to the regeneration vessel, or while the material remains in a supply bed above the regeneration zone proper. This vaporized organic or hydrocarbon material disengages from the supply bed in the top of the regenerator and mixes with the effluent flue gas therein and passes from the regenerator with the flue gas into the atmosphere, generally through a stack. In addition to conversion of the hydrocarbonaceous deposit, combustible vapors may be carried into the regeneration zone in the voids between contact material particles where the purging of the contact material as it leaves the conversion zone, is not adequate. Also, vapors may exist in the pores of the contact material which will expand under the lower pressure of the regeneration zone. A further source of combustible vapors is from liquid material in the contact material which vaporizes under the reduced pressure of the regeneration zone. More efficient purging of the contact material with inert gas as it leaves the conversion zone is not a complete answer to this problem, since purging only removes the vaporized material in the void spaces between contact material particles and will not remove those portions of the contaminant deposit which may be converted during transfer to the regeneration zone, any vapors in the pores of the contact material, or liquid hydrocarbons in the contact material.

The contact material is discharged from the bottom of the supply zone onto the top of the gravitating substantially compact mass of solids in the regeneration zone. Air is introduced into the regeneration zone at one or more intermediate levels to travel upwardly through part of the bed and downwardly through the other part of the bed, thereby burning contaminant from the solid material. In the uppermost portion of the regeneration zone, the gas is passed upwardly and disengages from the solid mass at the top of the regeneration zone. This gas mixes with the gas distilled from or discharged from the granular material in the supply zone and the combined stream of gas is discharged into the gas stack for discharge into the atmosphere. The oxygen content of the gas discharged from the top of the regeneration zone is generally low and, in the newer moving bed systems, may be less than about 3 percent by weight. While the temperature of the gas is high enough to effect combustion, therefore, the low oxygen content provides only partial combustion. Furthermore, the temperature of the mixed stream of gas rapidly drops below the combustion temperature. Thus, the gas discharged from the kiln during regeneration has heretofore carried with it a certain quantity of undesirable hydrocarbons which commingle with the atmosphere and cause the color of the gas to bear a yellowish or orange hue. This has been termed a "smoke plume" or simply "plume." Inasmuch as the refineries in which these cracking processes are located are usually in or near large cities, it is undesirable to contaminate the atmosphere with this material and efforts have been made to eliminate the plume.

Many attempts have been made to eliminate this objectionable smoke or oil plume resulting from regeneration of contact material, but such attempts have met with little success. One method, commonly known to the prior art, for eliminating smoke or oil plume is to pass the plume-bearing gas through an external burner in order to effect substantially complete combustion of the undesirable hydrocarbons. The external burner can be of a catalytic or a thermal type and the heat produced during the external burning recovered as heat in a waste heat boiler. This method of external burning of the plume-forming materials, of course, is expensive and normally can be justified only where the savings in fuel costs from the use of a waste heat boiler are high.

Another method of reducing oil plume is to introduce air into the stream of contact material as it enters the kiln so that the low-boiling components of the heavy oil present with the particles of solid contact material are burned in a short concurrent section. This method, while effective where the contaminant is high in low-boiling components, does not eliminate smoke or oil plume when the heavy oils contain appreciable amounts of high-boiling components because the temperatures reached at the top of the kiln are not sufficiently high to burn these high-boiling components in the heavy oil contaminants.

This invention contemplates the prevention of air pollution by the elimination of smoke and oil plume by passing gas containing undesirable hydrocarbons from the top of a regeneration kiln to a higher temperature zone within the kiln so as to bring about complete combustion of the plume-forming material present in the gas, thereby providing a simplified method and apparatus for the elimination of oil plume, heretofore unknown to the art. This elimination of the oil plume is accomplished without the addition of costly excess equipment and allows the heat obtained from the burning of the heavy oil, heretofore burned in the plume and wasted to the atmosphere, to be maintained within the combustion system where it can be utilized.

It is an object of the present invention to provide for conductance of plume-bearing gas located in the top section of a regeneration kiln to a high-temperature zone in the regeneration kiln so as to effect complete combustion of the plume-forming material contained in the gas.

A characteristic of the practice of the present invention is the purging of heavy oil from particles of solid contact material as it enters the regeneration kiln and the distributing of the oil-entrained purge gas into a higher temperature and oxygen-enriched zone of the kiln so that complete combustion of the heavy oil can be effected.

It is proposed, in accordance with the present invention, to remove gas, containing combustible materials, from the low-temperature section of a regeneration kiln and to convey the gas to a zone of higher temperature within the kiln where the combustible materials can be completely burned.

It is a specific object of the present invention to eliminate an oil plume by first partially burning the heavy oil in a plume burner and then conveying the higher-boiling heavy oil, not susceptible to burning in the plume burner, along with the resulting products of combustion to a higher temperature zone within the regeneration kiln so that complete combustion can be effected.

Figure 2:
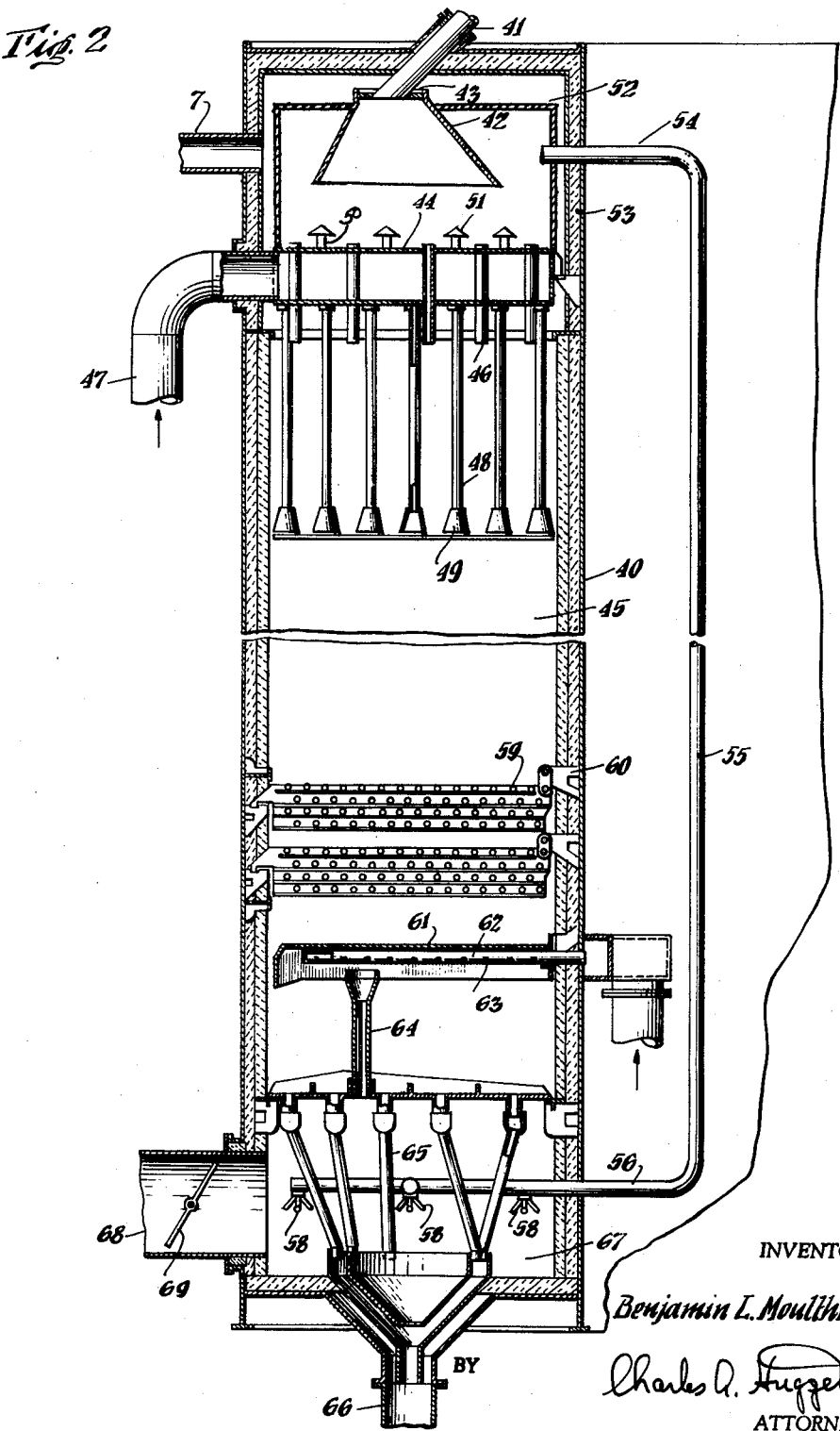
Figure 3:
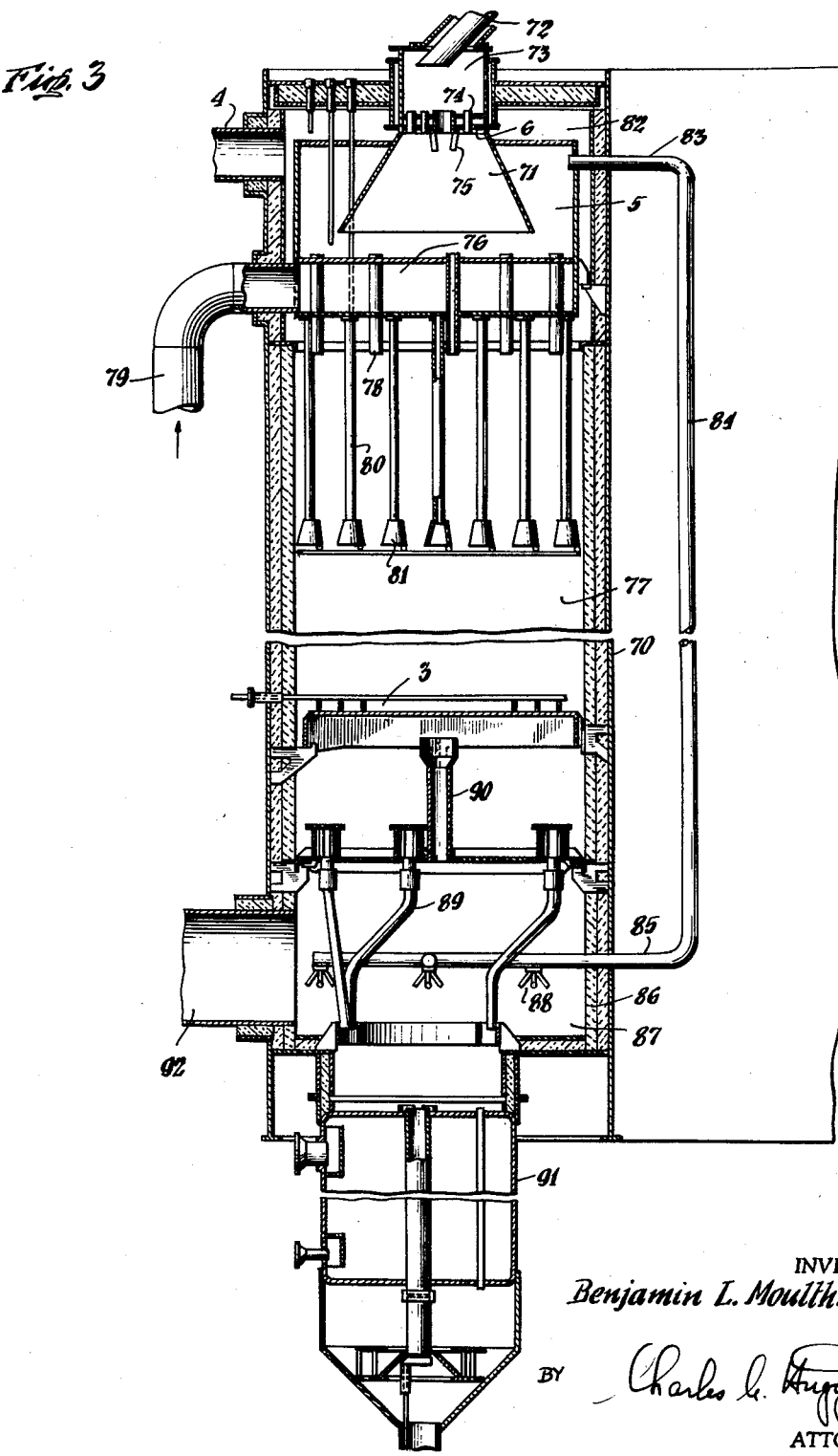

Other objects and advantages of this invention will be apparent from the following detailed description of several embodiments thereof in conjunction with the annexed drawings wherein:

Figure 1 is a view in vertical section of a regeneration kiln showing means for transporting purge gas containing plume-forming material from the top portion of the kiln into the central section of the combustion zone;

Figure 2 is a view in vertical section of a regeneration kiln showing means for transporting purge gas containing plume-forming material from the top of the kiln into the plenum chamber at the bottom of the kiln; and Figure 3 is a view in vertical cross-section of a regeneration kiln showing a plume burner assembly for pre-burning heavy oil contaminants and means for transporting the purge gas, containing plume-forming material and products of combustion from burning of the heavy oil, from the top of the kiln to the plenum chamber located above the tubular cooler at the bottom of the kiln.

Before describing in detail the structures depicted in the drawings, it is deemed desirable to describe the invention in general terms.

The invention discloses a method and apparatus for the regeneration of used granular contact material wherein the used contact material is supplied to a bed of contact material in a supply zone or conical section bearing a carbonaceous deposit and having combustible vapors associated therewith in the form of heavy oils. Air, or other gas having a suitably high oxygen content, is introduced into the supply zone to supply the oxygen necessary to burn the combustible vapors. Although some burning of the low-boiling combustible vapors takes place, there remain high-boiling combustible vapors that require a higher temperature than that attained in the supply zone. The gas in the supply zone containing the plume burning combustible vapors is conducted to a zone within the regeneration system where the temperature is high enough to bring about complete combustion of the undesirable hydrocarbons. This zone of high temperature can be a zone within the combustion section of the kiln, or in the bottom of the plenum chamber where the temperatures sustained are substantially higher than those in the supply zone at the top of the kiln.

The used contact material, after passing through the supply zone, gravitates into the upper section of a confined regeneration zone and passes therethrough as a substantially compact column. An oxygen-containing gas, such as air, is passed through this gravitating column under conditions suitable for the burning of the remaining hydrocarbonaceous contaminants on the contact material, with the gas being passed in countercurrent flow with the solids at least near the top of the zone. There may also be supplied sufficient air to effect complete combustion of the gas containing the plume-bearing material when this gas is introduced into the central section of the confined regeneration zone.

The current moving bed cracking process now used widely for cracking heavy hydrocarbons to produce increased amounts of motor gasoline, comprises a continuous system with the reactor being located above the kiln or regenerator and connected thereto by means of suitable conduits. Catalyst is elevated from a level beneath the kiln by pneumatic means to a separating vessel above the reactor and the catalyst is gravitated as a compact stream from the separator downwardly through an elongated gravity feed leg into the reactor. The feed leg is long enough to permit the catalyst to feed smoothly into the reactor against an advanced pressure, such as about 10 p.s.i. gauge. The reacting material is prepared for treatment and introduced into the reactor as a vapor, liquid or mixture thereof, and passed through the void spaces in the bed. The cracked products are removed from the bed continuously. The catalyst is contacted with a stripping gas in the bottom of the reactor to remove as much of the reaction product or reaction material as possible, and the stripped solids pass in compact form to the top of the regenerator, with the pressure being reduced on the solids, usually during transfer to the regenerator, to about atmospheric.

While not necessarily so, the kiln preferred and that depicted on the figures is a vertical vessel of annular cross-section. The figures show in vertical section one half of the cross-section of the kiln. Structurally, this provides a sturdy design and also permits the vertical pneumatic lift pipe, used to elevate the catalyst, to pass through the open center of the kiln 10. The spent contact material containing deposits of carbonaceous material and small quantities of high-boiling heavy oils passes into the kiln through inlet pipes 11 distributed about the top of the vessel. Each conduit 11 feeds into a pyramidal shaped member 12 which supplies a portion of the annular vessel. The catalyst gravitates as a compact mass through each pyramid 12 and passes through the vertical conduits 16 which lead the catalyst through the header boxes 14 located at the base of each pyramid. The catalyst on discharge from the conduits 16 forms a continuous gravitating mass throughout the annular cross-section of the vessel and this represents the upper extremity of the burning zone.

The pyramid 12 is enclosed in a hopper in bin 13 which fits tightly on header box 14, thereby preventing the escape of the plume-containing gases which are released by the catalyst in this region. A limited amount of air is introduced upwardly from the header box 12 through the pipes 20 which are uniformly distributed across the upper surface of the header box 14. The pipes 20 have covers or caps 21 located to prevent catalyst from entering the pipes without interrupting the upward flow of gas. As the gas passes upwardly it serves to strip the catalyst of plume-forming material and to partially burn the plume-bearing gas. The gas stream is disengaged from the catalyst bed at the annular opening between the bottom edge of the pyramid 12 and the vertical walls of the hopper 13. It is then withdrawn from the top of each hopper through the conduit 24.

Air, for combustion of the contaminants on the catalyst, is introduced through the conduits 17 to each header box 14 and passes down through the drop pipes 18 into the annular catalyst bed. The drop pipes are terminated at an intermediate level in the bed. The gas discharges from the drop pipes through conical distributors 19 which aid in bringing the gas into contact with the catalyst bed uniformly and without turbulence. A portion of the gas passes upwardly through the bed to burn a portion of the contaminant, the oxygen concentration becoming leaner as the gas rises until the gas discharges from the top of the combustion zone at the bottom of the short pipes 16 at a concentration of about 2-3 percent oxygen. This gas passes around and between the header boxes 14 and out the exit conduits 9 in the top portion of the vessel.

A second portion of the gas discharged from the conical distributors 19 passes downwardly through the gravitating catalyst bed to burn the remainder of the contaminant from the catalyst. The cold air introduced into the catalyst bed through the distributors 19 serves to keep the catalyst temperature down at that level, but as the gas and catalyst pass in concurrent flow below these distributors 19, the temperature of the mass rises to a maximum temperature as high as 1400–1450° F. A series of cooling coils 29 are supported on brackets 30 in the lower portion of the kiln. A cooling fluid is passed through these coils to prevent heat damage of the catalyst and afterburning in the lower gas withdrawal channels. The region just about the cooling coils has the highest temperature in the burning zone and also has air with a high percentage of oxygen. The plume-bearing gas withdrawn from the hopper 13 through the conduits 24 is passed downwardly through the central annular channel of the kiln 10 within the conduit 25 and is reintroduced into the catalyst bed at this level just above the cooling coils within the conduit 26 and is discharged into the bed through the nozzles 28. The temperature and oxygen concentration is adequate here for complete combustion and hence, the plume is burned.

A series of open-bottomed channels 2 are located in the bottom of the vessel 10 below the cooling coils. The gas is withdrawn from the catalyst bed into the channels. In order to prevent afterburning in the channels and also to provide a delicate control on the temperature of the catalyst, cool air is passed through conduit 31 into distributors 32 located within each channel. The gas discharges through uniformly distributed apertures 33 to commingle with the hot gas withdrawn from the catalyst bed, quickly lowering the temperature of the exhaust gas and diluting this gas to a level sufficient to prevent afterburning. The mixed gas streams are withdrawn from beneath the channels through the short vertical conduits 34 which lead the gas to the plenum chamber 37. This plenum chamber is formed by a horizontal plate 8 located across the lower portion of the annular vessel 10. The catalyst is transferred through the plenum chamber 37 within pipes 35 which are attached to the plate 8 and released from the bottom of these pipes 35 into a conical discharge outlet 7. The catalyst is withdrawn from the bottom of the vessel through a series of pipes 36 located about the bottom of the vessel and returned through a pneumatic lift to the top of the reactor. The gas is withdrawn from the plenum chamber 37 through the conduit 38 and discharged to the atmosphere. The valve 39 serves to adjust the split in flow of gas through the countercurrent and concurrent sections of the burning zone.

The temperature in the conical members during normal operation of a TCC kiln is about 850–900° F., which is sufficient to cause at least partial combustion of the plume-bearing gas but not high enough to insure complete combustion of the gas. A temperature of 1050–1100° F. is required to effect substantially complete combustion and temperatures of the order of 1400–1450° F., effect very rapid and complete combustion of the plume-forming constituents. The pressure within the cones is sufficiently higher than the pressure in the lower portion of the catalyst bed above the cooling coils so that flow of gas from the cones to the lower section of the vessel is assured.

Another adaptation of the present invention is illustrated in Figure 2, in which contact material containing a carbonaceous deposit and plume-forming constituents enters the inlet pipes 41. The contact material gravitates into cones 42 where it collects on inlet air manifolds or header boxes 44. Uniform distribution of the contact material is provided for by downcomers 46. Air to support combustion of the carbonaceous deposit on the contact material is supplied through air inlet 47 and distributed uniformly through the cross-section of the combustion zone of the kiln by air distributing tubes 48 and distributors 49. A portion of the air passes upwardly through the combustion zone and is withdrawn to a stack from the top of the vessel or annular kiln 40 through the pipes 7. A second portion of the air passes down through the combustion zone and is withdrawn from the solid compact bed of catalyst at a level just below the cooling coils 59 which are supported on hinged brackets 60. The gas is withdrawn under the channels 61 and commingles therewith cool air introduced through pipe 1 and perforated gas distributor 62. The holes 63 are uniformly distributed across the distributor to insure that adequate cool air commingles with all portions of the hot gases to effect cooling of the exhaust gases. The commingled gas streams are withdrawn through the vertical conduits 64 into the plenum chamber 67 and withdrawn therefrom through the pipe 68 for introduction into a stack, not shown. The butterfly valve 69 in the pipe 68 adjusts the split of gas between the upward flowing stream and the downward flowing stream. Catalyst is passed through the plenum chamber 67 confined in the pipes 65 and is withdrawn from the bottom of the vessel through the conduits 66. A small portion of the air in the header box 44 passes upwardly through the short conduits 50 and flows through the catalyst under the pyramid 42. Some burning occurs and these gases serve to strip the catalyst of plume-forming materials under the pyramid 42. The gases are disengaged from the bed between the edges of the pyramid and the vertical wall of the hopper 52 and then withdrawn from the top of the kiln through conduits 54 and 55 within the central portion of the kiln. This gas is reintroduced into the kiln through the conduit 56 which projects into the plenum chamber 67 at the bottom of the kiln. The purge gas and plume-forming materials are discharged from the pipe 56 through distributing heads 58 which are uniformly distributed throughout the plenum chamber 67.

The hot flue gas withdrawn from the upper portion of the bed through the conduits 7 in the section of the kiln is found to be within the temperature of about 800–850° F. and contains about 3 to 5 mol percent of oxygen. However, the temperature in the plenum chamber 67 at the bottom of the kiln 40 is found to be between about 975° F. and 1025° F., and contains 10 to 15 mol percent oxygen. This condition of high temperature and oxygen concentration in the bottom plenum chamber provides for complete combustion of the plume-forming materials present in the purge gas coming from the top of the kiln. After complete burning, the gas exits with the flue gas through the pipe 68.

Another embodiment of the invention is illustrated in Figure 3, in which the upper section of a TCC kiln 70 is equipped with a plume burner assembly for effecting combustion of a portion of the plume-forming materials which are released from the catalyst within the plume burner. The contact material to be regenerated is passed downwardly from the reactor through the pipe 72, which discharges into the upper section of the plume burner. This upper section provides a storage hopper 73 for the catalyst, being located directly above the conical burning section of the plume burner. The contact material is distributed into the conical section 71 by passing through a group of short downcomers 74 located in the bottom of hopper 73. Oxygen-enriched purge gas, necessary to support partial combustion of the plume-forming constituents, is supplied to the conical burning section 71 through nozzles 75 and apertures 6 located about the downcomers 74. This arrangement provides uniform distribution of the gas across the gravitating catalyst bed and permits the maximum combustion of the plume-forming materials within the burning section of the plume burner. The gas flows downwardly concurrently with the catalyst so that on first contact with catalyst the oxygen concentration is at its highest. The gas and remaining plume-forming material, not completely oxidized, is withdrawn from the gravitating catalyst within chamber 5 located outside of the burning section of the plume burner. This mixed stream of gases is withdrawn from the kiln through the conduits 83, 84 and 85 passing downwardly through the open center section of the kiln to be reintroduced by means of the conduit 85 into the plenum chamber 87 located at the bottom of the kiln. The distributor heads 88 are similar to those described with respect to Figure 2 and are used to uniformly distribute the gas through the plenum chamber 87. The catalyst passes downwardly through the short conduits 78, which extend through the header boxes 76. Air for combustion is introduced into the kiln through the conduit 79 into the header boxes 76 and passes downwardly through the elongated drop pipes 80 and is introduced into the catalyst bed through the conical distributors 81. A portion of this gas passes upwardly through the gravitating bed to burn a portion of the contaminant and is withdrawn from the top of the kiln through the discharge conduit 4. A second portion of the gas passes downwardly from the conical distributors 81 to burn the remaining portion of the contaminant from the catalyst and is withdrawn under the channels 3 in the lower section of the kiln for removal through the vertical conduits 90 to the plenum chamber 87. The gas is withdrawn from the plenum chamber 87 through the conduit 92. It is noted that in this embodiment of the invention no cooling coils are present in the burning section of the kiln. Instead, for temperature adjustment a cooler 91 is located directly below the kiln. The catalyst travelling through the conduits 89 within the plenum chamber 87 is at a substantially higher temperature than the catalyst travelling through the conduits 65 in the embodiment shown in Figure 2. It has been found that this, in at least some commercially operating TCC units, maintains the temperature within the plenum chamber 87 at a temperature of 1250° F. and higher. This temperature, coupled with the high oxygen concentration in the plenum chamber 87, is very satisfactory for insuring complete combustion of the plume-forming materials, and serves to remove from the exhaust gases discharged from this kiln all traces of the plume encountered in prior systems.

It is to be understood that this invention is not limited to any specific method of purging the top of the kiln. Any method whereby the purge gas from the top of a combustion section, which is responsible to a large degree for the plume-forming materials, is brought into a zone within the regeneration system, which is at a high enough temperature and which will provide the necessary oxygen enrichment so that the plume-forming materials can be completely consumed, comes within the scope of this invention.

It is also to be noted that the flow of purge gas may be countercurrent to the flow of contact material, as illustrated in Figures 1 and 2, or it may be concurrent as long as the purge gas is removed with the plume-forming materials entrained therein for introduction into a zone of higher temperature within the combustion section of the kiln. Also, the purge gas can be steam instead of air, with combustion taking place when the purge vapors mix with the hot flue gases in the lower portion of the kiln.

Distribution of the gas containing the plume-forming materials from the top of the kiln into the bed or into the lower section of the kiln, such as within the plenum chamber, may be accomplished by any device, such as channels, crosses, or spider-type multiple injection points. Also, the conveyance of the gas containing the plume-forming materials from the top of the kiln to a section within the kiln of higher temperature may be accomplished externally, as illustrated and described, or internally by means of tubes, channels, etc.

Further, it is to be understood that this invention can be applied to any hydrocarbon conversion system where there exists a gas with plume-forming materials therein capable of being conveyed to a zone of higher temperature where substantially complete combustion can be effected before the gas is discharged to the atmosphere.

Although the invention has been illustrated using oxygen-enriched purge gas, the scope of the invention is intended to cover the removal of entrained contaminants from the top of the regeneration section before this gas is commingled with an oxygen depleted exhaust gas discharging from the top of the burning section of the kiln with or without the supplying of an oxygen-enriched purge gas and directing the gaseous vapors containing undesirable plume-forming materials to a zone of higher temperature and sufficient oxygen enrichment to effect complete combustion thereof. Specific embodiments have been used to illustrate the invention, but it is understood that these are not limiting and that the only limitations intended are those contained in the attached claims.

What is claimed is:

1. In a process in which a granular contact material is passed cyclically as a gravitating compact mass through a reaction zone where it is contacted with hydrocarbons at conversion conditions and in which the spent contact material is passed through a regeneration zone where the contaminants are contacted with air at substantially atmospheric pressure to effect removal by burning of contaminants and further where a substantial amount of plume is formed during the regeneration causing atmospheric pollution, the improved method of preventing contamination of the air comprising: passing the contact material through a laterally confined inlet zone in the top of the regeneration zone, passing a stripping gas through the inlet zone to effect removal from the contact material of plume-forming vapors, passing the vapors and gas from said inlet zone as at least one laterally confined stream to a region in the lower portion of the regeneration zone where the temperature and oxygen concentration are adequate for rapid combustion of plume-forming vapors, gravitating the contact material from the inlet zone downwardly in the regeneration zone through a burning zone, introducing air into the burning zone to burn the contaminants from the contact material and also the plume-forming materials transferred from the inlet zone, withdrawing the regenerated contact material from the bottom of the regeneration zone and returning the regenerated contact material to the reaction zone for re-use in the process, and discharging the combustion gas from the regeneration zone to the atmosphere free of plume.

2. The method of claim 1 further characterized in that the stripping gas passed through the inlet zone is steam.

3. The method of claim 1 further characterized in that the stripping gas is air.

4. The method of claim 1 further characterized in that air is introduced into the combustion zone at an intermediate level to travel upwardly and downwardly through the gravitating bed of contact material and the vapors and gas from the inlet zone are re-introduced into the gravitating bed at a level below the level of air introduction into the combustion zone and the flue gas formed is removed from the upper end of the regeneration zone and the lower end of the regeneration zone.

5. The method of claim 1 further characterized in that air is introduced into the combustion zone at an intermediate level to travel upwardly and downwardly through the gravitating bed of contact material, the flue gas passing upwardly is removed from the top of the regeneration zone, the flue gas passing downwardly is withdrawn from the bottom of the combustion zone to a plenum zone in open contact with the contact material gravitating from the bottom of the combustion zone through said plenum zone, additional air is introduced into said plenum zone with the flue gas and the vapors and gas from the inlet zone are introduced into the plenum zone where the temperature and oxygen concentration are adequate for complete combustion of the plume-forming constituents, the gases being withdrawn from the plenum zone to the atmosphere and the regenerated contact material being withdrawn from said plenum zone and returned to the top of the reaction zone for re-use in the conversion process.

6. An apparatus for the regeneration of used granular contact material having hydrocarbonaceous contaminants deposited thereon, a portion of which are vaporizable under the temperature and pressure conditions of the contact material as it is supplied to an inlet section of the regeneration system, which comprises in combination: an inlet section located in the top of said regeneration system for receiving the gravitating contact material as it enters said regeneration system, means for supplying a purge gas at the bottom of said inlet section to provide a gaseous flow through the contact material as it gravitates through said inlet section, a regeneration chamber for receiving said contact material, means for supplying air to said contact material in said regeneration chamber to burn off the contaminant deposit contained therewith, means for conducting said gas from the inlet section at the top of the regeneration system as at least one laterally confined stream into a lower section of said regeneration chamber, means for withdrawing the flue gas resulting from the burning within the regeneration chamber of contaminants associated with said incoming contact material from the regeneration system, and means for withdrawing the regenearted contact material from the bottom of said regeneration system.

7. An apparatus for the regeneration of used granular contact material having hydrocarbonaceous contaminants deposited thereon, a portion of which are vaporizable under the temperature and pressure conditions of the contact material as it is supplied to an inlet section of a regeneration system, which comprises in combination: an inlet section located in the top of the regeneration system for receiving the gravitating contact material as it enters said regeneration system, means for supplying a purge gas at the bottom of said inlet section to provide a gaseous flow through the contact material as it gravitates through said inlet section, a regeneration chamber for receiving said contact material from said inlet section, means for supplying air to said contact material in said regeneration chamber to burn off the contaminant deposit contained therewith, a plenum chamber located at the lower portion of the regeneration system, means for withdrawing flue gas resulting from the burning of the contaminants within the regeneration zone into said plenum chamber, means for conducting said purge gas containing contaminants from the top of said regeneration system as at least one laterally confined stream to said plenum chamber whereby the contaminants contained therein are burned by the hot flue gas from said regeneration zone, means for discharging said flue gas in the plenum chamber from the regeneration system, and means for withdrawing the regenerated contact material from the bottom of the regeneration system.

8. An apparatus for the continuous regeneration of used granular contact material existing at a temperature within the range of about 700° F. to 975° F. and bearing a hydrocarbonaceous contaminant which becomes in part vaporized under existing temeprature conditions during passage of contact material to the regeneration system, which comprises in combination: an enclosed regeneration vessel having a contact material inlet pipe at the top thereof, an enclosed section located in the top of said regeneration vessel having inlet opening for receiving the incoming contact material and an outlet distributing system in the lower portion thereof for distributing the contact material in compact flow to a regeneration chamber, a purge gas distributing system located in the lower portion of said enclosed section for supplying oxygen-enriched gas, an air distributing system for conducting air into the regeneration chamber to promote burning of the contaminant associated with said contact material as it moves as a column through the regeneration chamber, a conduit connecting the closed inlet section to an intermediate section of the regeneration chamber for conductance of said purge gas containing contaminant to said intermediate section, a distributing system within the intermediate section of said regeneration chamber attached to said conduit for distributing said gas containing said contaminant from the top of said regeneration vessel into said intermediate section, a withdrawal system within the bottom of the regeneration chamber for removing the flue gas resulting from combustion of the contaminants associated with the incoming contact material from the regeneration system, a withdrawal system in the top of the regeneration zone for removing flue gas resulting from combustion of the contaminants associated with the incoming contact material from the regeneration system, and a contact material withdrawal system for removing the contact material from the regeneration system.

9. An apparatus for the continuous regeneration of used granular contact material existing at a temperature within the range of about 700° F. to 975° F. and bearing a hydrocarbonaceous contaminant which becomes in part vaporized under existing temperature conditions during passage of contact material to the regeneration system, which comprises in combination: a hopper centrally located in the top of said regeneration system for holding a supply of contaminated contact material, a series of short downcomers located in the bottom of said hopper for distributing said contact material into a conical section, a series of nozzles and apertures for directing a concurrent stream of oxygen-enriched gas into said downward flow of contact material in said conical section to effect combustion of the contaminant vapors associated with said contact material, a system of downcomers for distributing said contact material to a regeneration chamber after passing through the conical section, an air distributing system located within the regeneration chamber for supplying air to said contact material to burn off the contaminant deposit associated therewith, a plenum chamber located below the regeneration chamber, means for withdrawing flue gas resulting from combustion of said contaminant in said regeneration chamber into the plenum chamber whereby separation of the flue gas from the contact material is effected, conduit means connecting the conical section in the top of said apparatus with said plenum chamber for conducting the purge gas having contaminant therein from the top of the regeneration system to the plenum chamber, a system of downward extending nozzles located on the conduit in the plenum chamber to distribute the purge gas laden with contaminant vapors within the bottom section of the plenum chamber to effect combustion of said contaminant vapors, means for withdrawing said flue gas resulting from combustion of the contaminant associated with the incoming contact mass from the plenum chamber, and means for removing regenerated contact material from the lower section of said regenerative system.

References Cited in the file of this patent

UNITED STATES PATENTS

| | | |
|---|---|---|
| 2,301,044 | Heard et al. | Nov. 3, 1942 |
| 2,368,507 | Welty | Jan. 30, 1945 |
| 2,374,151 | Wolk et al. | Apr. 17, 1945 |
| 2,382,382 | Carlsmith et al. | Aug. 14, 1945 |
| 2,391,327 | Mekler | Dec. 18, 1945 |
| 2,753,295 | Ramella | July 3, 1956 |